3,004,984
PYRAZOLONYL CARBINOLS, AND PROCESS
OF MAKING SAME
Kürt Stäch, Mannheim, Johann Daniel Achelis, Heidelberg-Schlierbach, Erich Haack, Heidelberg, Hans-Guenther Kroneberg, Mannheim-Waldhof, and Hans-Georg Kurbjuweit, Mannheim-Feudenheim, Germany, assignors to C. F. Boehringer & Soehne G.m.b.H., Mannheim-Waldhof, Germany, a corporation of Germany
No Drawing. Filed May 18, 1959, Ser. No. 813,632
Claims priority, application Germany May 17, 1958
6 Claims. (Cl. 260—310)

The present invention relates to pyrazolonyl carbinols and to a process of making same.

It is one object of the present invention to provide new and valuable pyrazolonyl carbinols which have a noteworthy analgesic, antipyretic, and spasmolytic activity.

Another object of the present invention is to provide a simple and effective process of producing such valuable pyrazolonyl carbinols.

A further object of the present invention is to provide pharmaceutical compositions containing such new and valuable pyrazolonyl carbinols.

Still another object of the present invention is to use such new and valuable pyrazolonyl carbinols as analgesic, antipyretic, and/or spasmolytic agents.

Other objects of the present invention and advantageous features thereof will become more apparent as the description proceeds.

In principle the pyrazolonyl carbinols according to the present invention correspond to the following Formula I

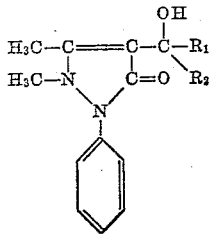

(I)

wherein $R_1$ represents hydrogen, a straight chain or branched alkyl radical, especially a lower alkyl radical, an aryl radical, especially a phenyl or tolyl radical, or an aralkyl radical, especially the benzyl radical, while $R_2$ represents a straight chain or branched alkyl radical, especially a lower alkyl radical, an aryl radical, especially a phenyl or tolyl radical, or an aralkyl radical, especially the benzyl radical.

It has been found that these new pyrazolonyl carbinols which, heretofore, have not been described in the literature, can be prepared in a simple manner and with good yields by reacting the easily available pyrazonyl carbonyl compounds of Formula II

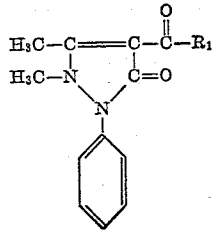

(II)

wherein $R_1$ represents hydrogen, a straight chain or branched alkyl radical, especially a lower alkyl radical, an aryl radical, especially a phenyl or tolyl radical, or an aralkyl radical, especially the benzyl radical, with an organo-metal compound, such as a Grignard compound of the formula $$XMgR_2$$

wherein $R_2$ represents a straight-chain or branched alkyl radical, especially a lower alkyl radical, an aryl radical, especially a phenyl or tolyl radical, or an aralkyl radical, especially the benzyl radical.

In said synthesis with an organo-metal compound according to the present invention the following reaction conditions have been found to be of special advantage:

(1) Use of an excess of organo-metal compound, preferably 3 moles of $XMgR_2$ for one mole of pyrazolonyl ketone or aldehyde.

(2) Use of a specific solvent mixture, preferably of absolute ether for the organo-magnesium compound, and tetrahydrofuran for the ketone or aldehyde.

(3) Maintaining a relatively low reaction temperature, preferably a temperature of 15° C. to 20° C. during the dropwise addition of the ketone or aldehyde solution to the Grignard reagent and of 30° C. to 35° C. for completing the reaction.

(4) Working up of the reaction mixture under mild conditions, preferably decomposition of the Grignard adduct by means of a saturated ammonium chloride solution at 15° C. to 20° C. and removal of the solvent mixture at as low a temperature as possible.

The pyrazolonyl carbinols obtained when following such a procedure are substantially pure. Small amounts of impurities can be removed by simply washing the reaction product with a suitable solvent such as ether, acetic acid ethyl ester, or ligroin. When extremely pure reaction products are required, they can readily be obtained by recrystallization from the solvents mentioned above while heating carefully.

The new pyrazolonyl carbinols, also designated as antipyryl carbinols, as prepared according to the present invention have outstanding analgesic, antipyretic, and spasmolytic properties and are useful therapeutic agents.

The following examples serve to illustrate the present invention without, however, limiting the same thereto.

EXAMPLES 1 TO 8

Tertiary pyrazolonyl carbinols listed hereinafter can be prepared according to the following procedure:

A solution of 0.2 mole of an antipyryl ketone in 800 cc. to 1000 cc. of tetrahydrofuran is added drop by drop at 15° C. to 20° C. to a solution of 0.6 mole of the corresponding alkyl magnesium compound $XMgR_2$, which was prepared in the usual manner in 600 cc. of absolute diethyl ether while vigorously stirring mechanically and cooling from time to time. The reaction mixture is then kept at 20° C. to 25° C. for one hour and is heated to 30° C. to 35° C. for three hours. Saturated ammonium chloride solution is added in small amounts at 15° C. to 20° C. to the reaction mixture to decompose the resulting Grignard compound. The separated organic solvent layer is washed with saturated sodium chloride solution, dried over sodium sulfate, and the solvents are distilled off in a vacuum at 30° C. to 35° C. The remaining residue is titurated with a small amount of ether, filtered off by suction, and washed with ether. If required, the reaction product can be recrystallized from acetic acid ethyl ether.

Table I

| Ex. | Antipyryl ketone | Grignard compound prepared from | Reaction product | Yield in percent | M.P., °C. |
|---|---|---|---|---|---|
| 1 | $R_1=CH_3$ | $CH_3J$ | Antipyryl dimethyl carbinol. | 55–60 | 124–126 |
| 2 | $R_1=C_2H_5$ | $C_2H_5J$ | antipyryl diethyl carbinol. | 65–70 | 107–109 |
| 3 | $R_1=n-C_3H_7$ | $n-C_3H_7Br$ | antipyryl di-n-propyl carbinol. | 75–80 | 87–89 |
| 4 | $R_1=CH_3$ | $C_6H_5Br$ | antipyryl methyl phenyl carbinol. | 70–75 | 116–118 |
| 5 | $R_1=n-C_3H_7$ | $CH_3J$ | antipyryl methyl (n-propyl) carbinol. | 70–75 | 103–105 |
| 6 | $R_1=iso-C_3H_7$ | $CH_3J$ | antipyryl methyl (isopropyl) carbinol. | 70–75 | 104–106 |
| 7 | $R_1=CH_3$ | $n-C_3H_7Br$ | antipyryl methyl (n-propyl) carbinol. | 65–70 | 103–105 |
| 8 | $R_1=CH_3$ | $n-C_4H_7Br$ | antipyryl methyl (n-butyl) carbinol. | 30–40 | 71–73 |

EXAMPLES 9 TO 12

Secondary pyrazolonyl carbinols according to the present invention are prepared in an analogous manner by using antipyryl aldehyde as the one reaction component in place of the antipyryl ketones of Examples 1 to 8. The procedure, however, may be simplified by adding the solid antipyryl aldehyde, without previous dissolution, to the ethereal solution of the alkyl magnesium compound to which 500 cc. to 600 cc. of tetrahydrofuran have been added. Otherwise the procedure is the same as described in Example 1. The following compounds have been prepared.

Table II

| Ex. | Antipyryl aldehyde (II) | Grignard compound prepared from | Reaction product | Yield in percent | M.P., °C. |
|---|---|---|---|---|---|
| 9 | $R_1=H$ | $n-C_3H_7Br$ | antipyryl n-propyl carbinol. | 50–55 | 71–74 |
| 10 | $R_1=H$ | $n-C_4H_9Br$ | antipyryl n-butyl carbinol. | 50–55 | 93–96 |
| 11 | $R_1=H$ | $iso-C_3H_7Br$ | antipyryl isopropyl carbinol. | 60–65 | 113–115 |
| 12 | $R_1=H$ | secondary $C_4H_9Br$ | antipyryl second-butyl carbinol. | 60–65 | 95–98 |

According to another embodiment of the present invention the secondary pyrazolonyl carbinols of the above given Formula I, wherein $R_1$ is hydrogen, can be prepared by reduction and preferably by catalytically hydrogenating under pressure pyrazolonyl ketones of Formula III

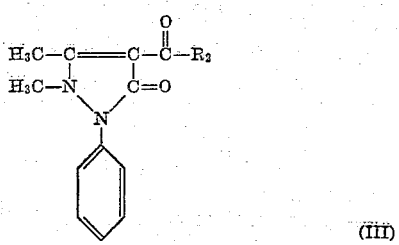

(III)

wherein $R_2$ represents a straight chain or branched alkyl radical, an aryl radical, or an aralkyl radical. The following example serves to illustrate this hydrogenation process without, however, being limited thereto.

EXAMPLE 13

52 g. (0.2 mole) of antipyryl (n-propyl) ketone are hydrogenated in 600 cc. of methanol at 100° C. under a pressure of 100 atmospheres with the addition of 4 g. of Raney nickel catalyst and 2 g. of sodium hydroxide for 8 hours. After filtering off the catalyst, the reaction mixture is neutralized by the addition of dilute hydrochloric acid. The solvent is then evaporated in a vacuum by heating on the water bath. The residue is dissolved in ether. The ethereal solution is washed several times with water and dried over sodium sulfate. After distilling off the ether, 40 g. of an oily residue are obtained. On trituration with a small amount of ether, crystallization sets in and 17.8 g. of antipyryl (n-propyl) carbinol of the melting point 67–74° C. are obtained. Yield: 34% of the theoretical yield. An additional amount of 3.1 g., corresponding to 6% of the theoretical amount, are obtained from the mother liquors. On recrystallization from acetic acid ethyl ester, the compound melts at 72–74° C. The total yield is about 40%.

Of course, many changes and variations in the reaction components and the reaction conditions, temperature, duration and the like, in the method of working up the reaction mixture and of purifying the reaction products may be made by those skilled in the art in accordance with the principles set forth herein and in the claims annexed hereto. Thus, pyrazolonyl carbonyl compounds and organo-metal compounds with other substituents $R_1$ and $R_2$ as those given in the examples may be used as reaction components. In place of Grignard compounds as used in Examples 1 to 12, there may be employed other organo-metal compounds, such as organo-lithium compounds and the like, as they are conventionally employed in synthetic processes using such organo-metal compounds.

Especially valuable secondary and tertiary alkyl carbinols according to the present invention are the following compounds:

(a) Antipyryl methyl (n-propyl) carbinol,
(b) Antipyryl methyl (isopropyl) carbinol,
(c) Antipyryl propyl carbinol.

These compounds are only about half as toxic as the highly effective and widely used dimethylamino phenyl dimethyl pyrazolone, also designated as aminopyrine, when tested by intraperitoneal injection in mice.

On intramuscular injection into muscle tissue of rabbits, it was found that solutions of the two compounds (a) and (b) in aqueous polyethylene glycol are well tolerated by the tissue and are more readily tolerated than a widely used combination solution of aminopyrine and phenyl butazone.

Compounds (a) and (b) have an analgesic activity about twice as high as that of aminopyrine while compound (c) is at least as analgesically effective as aminopyrine in animal test.

The antipyretic effect of compound (a) was found in tests on rabbits to be twice as high as that of aminopyrine while compounds (b) and (c) are about as effective antipyretic agents.

On testing these compounds for their spasmolytic activity upon the isolated rabbit ileum exposed to the action of acetyl choline, compound (a) was found to be four times, compound (c) about twice as effective as aminopyrine, while compound (b) had about the same activity.

The compounds and especially compound (a) produced on oral administration to rabbits a maximum blood level which was about 20% higher than that of aminopyrine. Furthermore, said maximum blood level was attained in about one third of the time required by aminopyrine.

The new tertiary and secondary pyrazolonyl carbinols according to the present invention may be administered orally, parenterally, or in the form of suppositories.

The preferred mode of administration is oral administration in the form of liquid or solid preparations, such as tablets, pills, dragees, powders, capsules, solutions, emulsions, suspensions, dispersions, or in any other suitable form.

In the case of powders, fine uniform dispersion of the active compounds together with a usual carrier throughout said powder is of importance. Such a fine dispersion can be achieved by intimately mixing and milling the active compound, for instance, in a ball mill with a solid pulverulent extending agent to the desired degree of fineness or by impregnating the already milled, finely powdered, solid carrier with the active compound in water or with a solution thereof in a suitable organic solvent and then removing the water or solvent.

A fine dispersion of the active compound in water, sirup and the like can also be brought about by emulsifying said compound with the aid of a dispersing or emulsifying agent.

When preparing tablets, pills, powders, and the like solid preparations, the commonly used carriers and diluting agents, binders, and the like tableting adjuvants are employed, such as sugar, lactose, starch, pectin, bolus alba, stearic acid, magnesium stearate, and as binders gelatin, gum arabic, methyl cellulose, carboxy ethyl cellulose, yeast extract, agar, tragacanth, and others. It is, of course, understood that any of the tableting materials conventionally used in pharmaceutical practice can be employed provided there is no incompatibility with the active compound.

Injectable solutions may also be prepared.

The content of said active compounds in compositions according to the present invention may vary. Ordinarily, the compositions according to the present invention should not contain less than about 1% of the active compound. The preferred amounts to be employed are between about 10% and about 50%. To use greater amounts is also possible although administration of suitabe doses becomes more difficult. Tablets, each containing, for instance, between about 50 mg. and about 300 mg. of the active compound, have proved to be especially suitable.

We claim:
1. Antipyryl methyl (n-propyl) carbinol.
2. Antipyryl (n-propyl) carbinol.
3. Antipyryl methyl (isopropyl) carbinol.
4. In a process of producing a pyrazolonyl carbinol of the formula

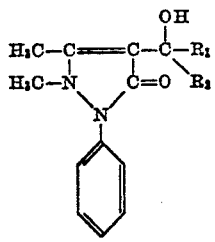

wherein $R_1$ indicates a member selected from the group consisting of hydrogen and lower alkyl radicals, and
$R_2$ is a lower alkyl radical, the steps which consist in adding a pyrazolonyl carbonyl compound of the formula

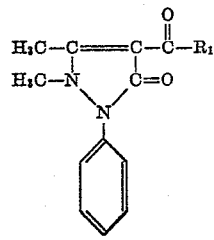

wherein $R_1$ represents a member selected from the group consisting of hydrogen and lower alkyl radicals at a temperature not substantially exceeding 20° C. to a solution of a Grignard compound of the formula $$XM_gR_2$$

wherein X is halogen and $R_2$ is a lower alkyl radical, in ether, said ethereal solution of the Grignard compound containing tetrahydrofuran, said Grignard compound being used in excess over the amount theoretically required for reaction with the carbonyl group, increasing the temperature of the reaction mixture to a temperature between about 30° C. and about 35° C. to complete the reaction, adding an aqueous saturated ammonium cholride solution at a temperature not substantially exceeding 20° C. to the reaction mixture to decompose the reaction product, separating the organic solvent layer from the aqueous layer, and removing, by distillation, the solvents from the organic solvent layer at a temperature not substantially exceeding 35° C.

5. The process according to claim 4, wherein the pyrazolonyl carbonyl compound is added in solution in tetrahydrofuran to the ethereal solution of the organometal compound.

6. The process according to claim 4, wherein 3 moles of the Grignard compound are used for each mole of pyrazolonyl carbonyl compound.

References Cited in the file of this patent
UNITED STATES PATENTS
2,921,940     Ramsden _____ Jan. 19, 1960
OTHER REFERENCES
Michaelis et al.: Ber. Duet. Chem., vol. 41, pages 2671–72 (1908).
Ledrut et al.: Chem. Abstracts, vol. 47, col. 4334 (1953).

UNITED STATES PATENT OFFICE
CERTIFICATE OF CORRECTION

Patent No. 3,004,984                      October 17, 1961

Kurt Stäch et al.

It is hereby certified that error appears in the above numbered patent requiring correction and that the said Letters Patent should read as corrected below.

In the grant, line 1, and in the heading to the printed specification, line 4, name of first inventor, for "Kürt Stäch", each occurrence, read -- Kurt Stach --; column 1, line 56, for "pyrazonyl" read -- pyrazolonyl --; column 2, line 65, for "titurated" read -- triturated --; column 3, Table II, column 4, line 7 thereof, for "second-" read -- secondary --; column 4, line 61, for "solated" read -- isolated --; column 5, lines 37 and 38, for "suitabe" read -- suitable --; column 6, line 36, for "cholride" read -- chloride --.

Signed and sealed this 10th day of April 1962.

(SEAL)
Attest:

ERNEST W. SWIDER                      DAVID L. LADD
Attesting Officer                    Commissioner of Patents